United States Patent
Schwed

(10) Patent No.: US 9,623,700 B2
(45) Date of Patent: Apr. 18, 2017

(54) APPARATUS AND METHOD FOR COLLAPSING AND INTERLOCKING CANVAS ON A FRAME

(71) Applicant: Michael Schwed, Red Hook, NY (US)

(72) Inventor: Michael Schwed, Red Hook, NY (US)

(*) Notice: Subject to any disclaimer, the term of this patent is extended or adjusted under 35 U.S.C. 154(b) by 0 days.

(21) Appl. No.: 14/743,366

(22) Filed: Jun. 18, 2015

(65) Prior Publication Data

US 2016/0368313 A1 Dec. 22, 2016

(51) Int. Cl.
*B44D 3/18* (2006.01)
*D06C 3/08* (2006.01)
*B23P 19/00* (2006.01)

(52) U.S. Cl.
CPC .............. *B44D 3/185* (2013.01); *B23P 19/00* (2013.01); *B44D 3/18* (2013.01); *D06C 3/08* (2013.01)

(58) Field of Classification Search
CPC ....... B41F 15/34; B41F 15/36; H05K 3/1225; A47G 5/00; B44D 3/185; B44D 3/18; D06F 59/08; D06C 3/00; D06C 3/08; D06C 2700/02
See application file for complete search history.

(56) References Cited

U.S. PATENT DOCUMENTS

| | | | |
|---|---|---|---|
| 1,443,923 A * | 1/1923 | Nercam | B44D 3/185 38/102.8 |
| 1,964,332 A * | 6/1934 | Rembaum | A47G 5/00 160/369 |
| 2,294,642 A | 5/1941 | Welder | |
| 2,325,268 A * | 7/1943 | Nelson | D06F 59/08 38/102.1 |
| 3,494,409 A | 2/1970 | Prechyl et al. | |
| 3,556,919 A * | 1/1971 | Johns et al. | A61F 13/00991 428/534 |
| 3,774,326 A | 11/1973 | Selden | |
| 3,830,278 A * | 8/1974 | Packer | B44D 3/185 160/378 |
| 3,922,765 A | 12/1975 | Hogendyk | |
| 4,144,660 A * | 3/1979 | Lamb | B44D 3/185 160/378 |
| 4,179,830 A * | 12/1979 | Lamb | B44D 3/185 160/378 |
| 4,471,873 A * | 9/1984 | Thomas | B60Q 7/005 116/173 |
| 4,858,349 A | 8/1989 | Walsh et al. | |
| 5,056,247 A | 10/1991 | Loomie | |
| 5,113,611 A * | 5/1992 | Rosson | B44D 3/185 101/127.1 |

(Continued)

*Primary Examiner* — Ismael Izaguirre
(74) *Attorney, Agent, or Firm* — Gearhart Law LLC

(57) ABSTRACT

A frame for stretching a fabric material, having a plurality of outer frame members; a plurality of interlocking joints and a plurality of connector pieces. The plurality of outer frame members are adapted and configured to receive the fabric material in the plurality of interlocking joints. The plurality of connector pieces are adapted and configured to fit into the plurality of interlocking joints thereby connecting the plurality of interlocking cornered joints to the plurality of outer frame members. The plurality of connector pieces are adapted and configured such that the fabric material is stretched such that the plurality of connector pieces enables the fabric material to be taut across the frame.

22 Claims, 11 Drawing Sheets

}

(56) References Cited

U.S. PATENT DOCUMENTS

| | | | |
|---|---|---|---|
| 5,193,603 A * | 3/1993 | Whisnant | A47G 5/00 |
| | | | 160/135 |
| 6,253,471 B1 * | 7/2001 | Strauh | B44D 3/185 |
| | | | 160/381 |
| 6,422,292 B1 | 7/2002 | Berry et al. | |
| 8,353,327 B2 | 1/2013 | Domingue et al. | |
| 2013/0333851 A1 | 12/2013 | Chen | |

\* cited by examiner

Prior Art

APPARATUS AND METHOD FOR COLLAPSING AND INTERLOCKING CANVAS ON A FRAME

CLAIM OF PRIORITY

This application claims no priority to any previous patent or patent application.

FIELD OF THE EMBODIMENTS

The field of the invention and its embodiments relate to frames that are used to mount and to provide tension for flexible fabrics, such as artist's canvases, silk screen, digital photographs, and the like.

BACKGROUND OF THE EMBODIMENTS

Conventional stretched fabric for artwork (i.e. painter's canvas or photographic print on fixed frame) is not intended for disassembly. Therefore, larger sizes of stretched fabric on permanently assembled frames become difficult to transport, difficult to package and prohibitively expensive to ship though common carriers.

Review of related apparatus and methods:

U.S. Pat. No. 3,922,765 teaches a spreading and stretching apparatus for textile calendar machines especially adapted for use with knitted and other tubular fabrics to prevent the pinching and tearing of the fabric as it is drawn into the calendar rolls of the machine.

U.S. Pat. No. 2,294,642 teaches an apparatus for spreading tubular fabric comprising frame members having at one end outwardly extending portions of reduced thickness and at the other end inwardly extending portions, a plurality of grooved pulley members revolvably mounted on the frame members, a belt member passing over the pulley members and extending beyond the periphery thereof along the outer sides of the frame member, pulley members revolvably mounted on the frame members adjacent the inwardly extending portions, said latter pulleys being of greater diameter than the other pulley members and being grooved deeper than the thickness of the belt member.

U.S. Pat. No. 3,494,409 discloses a canvas, a knockdown stretch frame embodying a first pair of longitudinal side frame members having longitudinally rabbeted surfaces residing flatwise atop coacting reverse surface portions of said canvas, the respectively adjacent marginal edge portions of said canvas projecting beyond predetermined outward marginal edges of said side frame members and being fashioned into lateral flaps, said flaps overlapping and being permanently attached to the marginal edges of said side frame members, the respective ends of said frame members being mitered and mortised and terminating in positions spaced inwardly from the respectively adjacent free transverse marginal end portions of said canvas, a pair of transverse end frame members complemental to said side frame members and spanning the space between the cooperable mitered ends of said side frame members and having mortised, mitered and mated ends movably abutting the cooperable mitered ends of said side frame members, said transverse end frame members also having longitudinally rabbeted surfaces residing atop portions of the reverse surface of said canvas, the respective transverse end portions of said canvas projecting beyond the outward lengthwise edges of said transverse end frame members and providing stretching and holddown flaps, said outward lengthwise edges being provided with longitudinal grooves, said holddown flaps being tautly stretched over said lengthwise edges and bridging said grooves, flap retaining members removably lodged in said grooves and serving to retentively nest and anchor said holddown flaps in their respective grooves, and, in combination, a plurality of readily applicable and removable assembling and spreading wedges fitted removably in the coacting mortised end portions of the side members and transverse end frame members respectively.

U.S. Pat. No. 3,774,326 discloses a stretch and roll frame adapted to be used for supporting a rollable workpiece such as canvas needlework and the like thereon, comprises a first elongated frame member, a second elongated frame member, a first side frame member, and a second side frame member. The first and second elongated frame members each have attaching means provided thereon intermediate the ends thereof for detachably fastening one of the pairs of sides of a workpiece thereto.

U.S. Pat. No. 4,858,349 teaches a stretch frame in combination with a fabric anchoring member and is formed from a lower section having a concave upper surface and a transparent flexible plastic upper section. Fabric is grasped between the sections when they are drawn compressably together. The curved surface grasps the fabric ends without damaging the fabric which is particularly advantageous with hemmed ends. The clear upper section allows the artist to visually observe the coloration of the fabric ends. The anchoring members are mounted on light weight side frame members to form a frame easily handled and placed on the artist's easel.

U.S. Pat. No. 5,056,247 teaches a sheet material suspension device, and in particular to an apparatus for the suspension and tension of fabric for the purpose of hand dyeing and painting. The apparatus comprises specially designed hooks for attaching the fabric to an elastic band which in turn is attached to a lightweight, collapsible support frame. The method involves unfolding the frame so the bars are substantially equidistant at their ends, placing the elastic in notches at the ends of the bars, pulling loops of the elastic through the notches, placing the hooks on the inside of the loops, and placing the hooks into the hem of the fabric.

U.S. Pat. No. 6,422,292 teaches a unique inner frame member interlocking orthogonally along the inner length of outer frame member to prevent the tension of the canvas from deflecting the frame inwardly.

U.S. Pat. No. 8,353,327 discloses a canvas stretching assembly with adjustable stretching bars connecting in an end-to-end configuration that allow for the stretching of a canvas, even after the canvas is mounted thereon, with the degree of stretching being adjustable in multiple directions. The canvas stretching assembly, when disassembled, may be compactly stored, which is especially appreciated for shipment purposes.

US Patent Publication 2013/0333851 discloses a frame assembly capable of self-stretching fabric evenly has an outer frame, a demountable inner frame mounted in the outer frame and a positioning mechanism with retaining flaps and engaging sections disposed between the inner frame and the outer frame. A patterned fabric covers a front of the inner frame and is wrapped on an outer annular surface of the inner frame. The inner frame is then pushed into the outer frame, so the fabric is held between the outer frame and the inner frame, and is stretched and evenly smoothed by the positioning mechanism of the frame assembly. When the inner frame is pushed out of outer frame, the fabric can be changed and replaced with another fabric with a different pattern. Therefore, replacing the fabrics on the frame assembly is easy and the fabrics are not damaged.

Thus, various devices are known in the art. However, their structure and means of operation are substantially different from the present disclosure. The other inventions fail to solve all the problems taught by the present disclosure. At least one embodiment of this invention is presented in the drawings below and will be described in more detail herein.

SUMMARY OF THE EMBODIMENTS

In general, the present invention succeeds in conferring the following, and others not mentioned, benefits and objectives. A frame for stretching a fabric material, having a plurality of outer frame members; a plurality of interlocking joints and a plurality of connector pieces. The plurality of outer frame members are adapted and configured to receive the fabric material in the plurality of interlocking joints. The plurality of connector pieces are adapted and configured to fit into the plurality of interlocking joints thereby connecting the plurality of interlocking cornered joints to the plurality of outer frame members. The plurality of connector pieces are adapted and configured such that the fabric material is stretched such that the plurality of connector pieces enables the fabric material to be taut across the frame.

The plurality of interlocking members may connect to form an angle of the outer frame members. The plurality of interlocking members may also connect to form a corner of the outer frame members. The plurality of interlocking joints further comprises at least one lift off hinge. The at least one lift off hinge is adapted and configured to work with at least one dowel. The at least one lift off hinge is adapted and configured to work with a screwing mechanism. The plurality of outer frame members further comprises at least one dowel member and at least one hollow opening where the at least one hollow opening adapted and configured to receive the at least one dowel member.

The invention also comprises a kit for creating a collapsible frame for fabric material, where the plurality of component pieces has: a hollow tube able to receive the plurality of component pieces; a plurality of outer frame members; a plurality of interlocking joints; and a plurality of connector pieces. The plurality of outer frame members are adapted and configured to receive a fabric in the corners of said plurality of interlocking joints. The plurality of connector pieces are adapted and configured to fit into the plurality of interlocking joints thereby connecting the plurality of interlocking joints to the plurality of outer frame members. The plurality of connector pieces are adapted and configured to be movable such that the fabric material is stretched to a desired tightness over the frame. The kit has a securing means which is attached to the inner lining of the hollow tube. The securing means may be hook and loop fasteners, button, snaps, hooks or magnets.

The invention also includes a method for stretching a fabric material over a frame, the steps of which include: connecting a plurality of outer frame members via a plurality of interlocking cornered joints into a shape corresponding to a fabric material; placing the fabric material into the connected plurality of outer frame members; inserting a plurality of connector pieces into the plurality of interlocking joints; moving said plurality of connector pieces such to stretch the fabric material to a desired tautness.

It is an object of the present invention where the plurality of outer frame members are collapsible.

It is an object of the present invention where the fabric material is at least one of canvas, light sensitive paper, cellulose nitrate, cellulose acetates, and polyester.

It is an object of the present invention where the plurality of connector pieces further comprises a screwing mechanism.

It is an object of the present invention where the frame comprises at least one sliding piece, which are adapted and configured to cover the plurality of connector pieces.

It is an object of the present invention where the plurality of outer frame members and plurality of interlocking cornered joints are adapted and configured to be positioned along a horizontal end of the plurality of outer frame members or along a vertical end of the plurality of outer frame members.

It is an object of the present invention where the frame comprises at least one cross member bar which may be positioned horizontally, vertically or diagonally between the plurality of outer frame members.

It is an object of the present invention where the at least one cross member bar further comprises a spring which is adapted and configured to provide tension between the plurality of outer frame members.

It is an object of the present invention where the plurality of outer frame members has a movable hinged joint which can receive a fabric material.

DESCRIPTION OF THE PREFERRED EMBODIMENTS

Figure 1:
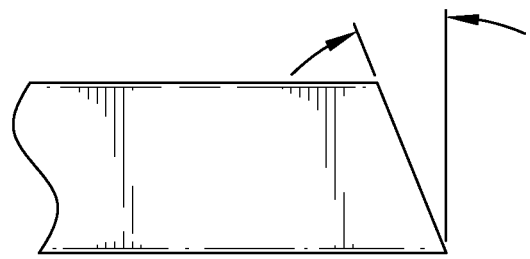
FIG. 1 shows a perspective view of the prior art.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Figure 2:
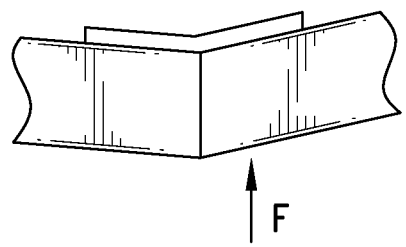
FIG. 2 shows a perspective view of the prior art.

The art industry is seeking a new and novel structural frame which is easily assembled and disassembled and which provides a method for effectively stretching a fabric material such as canvas or a photographic print. Also needed is a solution to disassemble the structural frame and fabric in such a way for easier, safer and more economical shipping options. The present invention seeks to solve these problems. Referring now to FIG. 1 and FIG. 2 both showing the prior art method for securing a canvas or fabric material to a frame.

Figure 3:
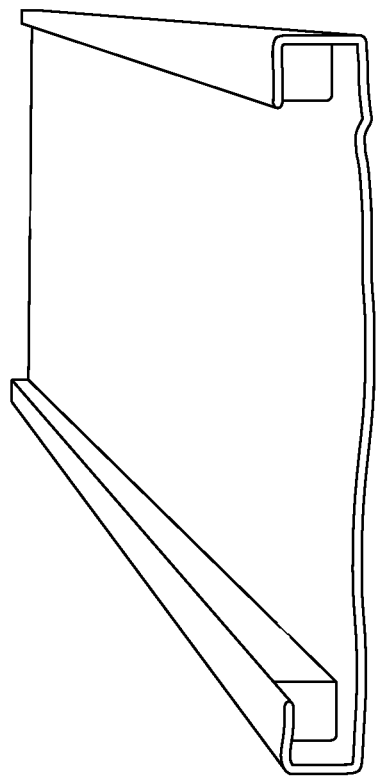
FIG. 3 shows the prior art and a perspective view showing the fabric material being cut in a preferred way of the present invention.
Figure 3:
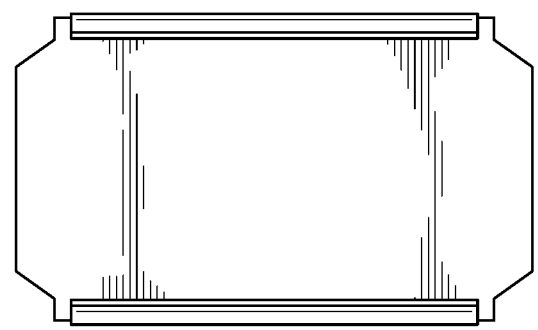

FIG. 1 and FIG. 2 show that the frame's crossbars are hinged to allow for bending and collapsing of the frame. This effectively shortens the frame's crossbars sufficiently to be inserted into the long bars with the canvas in an unstretched manner. When the bent/shortened crossbars are pushed to be straight, they are effectively lengthened which provides outward force on the long bars and increased tension on the canvas thereby "stretching" it to a desired tautness. In addition FIG. 1 and FIG. 2 show that the hinged cross bars are cut at a slight angle which necessitates extra force to make them straight when inserted into the long bars for assembly. This extra force required adds outward spring tension to the cross members when the canvas is attached to the cross member during assembly, which ultimately increases tension on the canvas perpendicular to the cross members. Also known in the prior art, and as shown in FIG. 3 prior art, a fabric material, such as canvas, can be inserted into the angled hinges and folded over to create a desired tension (as better illustrated in FIG. 3). The present invention seeks to improve this method. FIG. 3 shows the improved method and shows that the fabric or canvas may be cut in a particular manner to allow for easier corner folding after re-assembly.

The present invention is comprised of a plurality of outer frame members that when assembled form a rectangular or square shape that corresponds to an artistic canvas. The present invention is not limited to canvas as any fabric material may work including fabric of all shapes and weights. Ultimately, the artist work is placed into the plurality of outer frame members. Such outer frame members are separate component pieces and are assembled and joined at the corners through a variety ways. Once assembled, the canvas is placed into the inset created by the connected outer frame members and further secured through a plurality of interlocking joints. Such interlocking joints are further secured by a plurality of connectors which correspond to the type of interlocking joints. Once the canvas is secured into the outer frame members the plurality of connectors may be used to stretch and tighten the canvas across the assembled frame. The preferred embodiment of the present invention includes a 45 degree angled slot which increases overlap of the canvas and provides additional resistance to bending and allows for better clasping of the canvas. In another embodiment the angled slot may be of varying angles.

Figure 4:
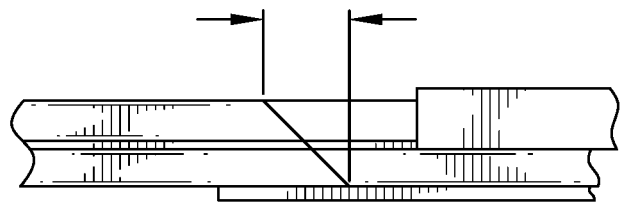
FIG. 4 shows a perspective view of the slider of the present invention.

FIG. 4 is a perspective view of the slider which in the preferred embodiment may be positioned on the cross member bar such as the center bar. In another embodiment, the slider may be positioned on individual outer frame members and moved to protect the assembled joints and connectors. In the preferred embodiment, assembly of the frame and the method for stretching a fabric material over a frame begins with removing all the component pieces of the frame from the hollow tube which holds the component pieces. Unrolling the canvas and detaching the canvas from the hollow tube. Once all the pieces are removed and the canvas is unrolled and detached the frame can now be assembled. The frame can be assembled by connecting the outer frame members into a shape corresponding to the artist work; placing the fabric material of the artistic work into the loosely connected outer frame members; using the interlocking cornered joints to secure the fabric material to the outer frame members and finally inserting the connector pieces into the interlocking joints. By moving the connector pieces the canvas is stretched to a desired tautness. Once at a desired tautness, the slider can be moved to cover the connectors and joints and additional cross member bars can be added between the outer frame members for further support.

Figure 5:
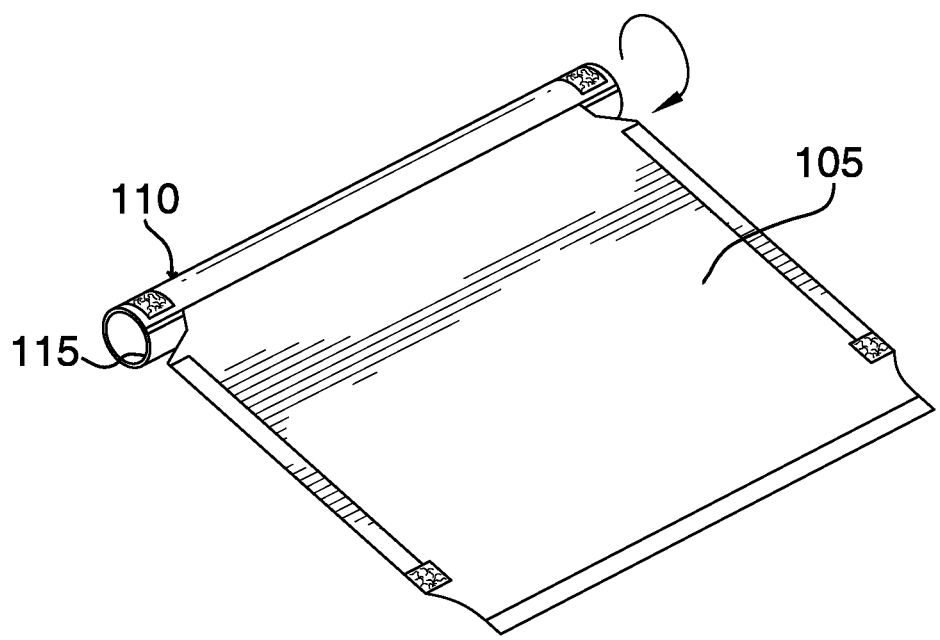
FIG. 5 shows a perspective view of the securing mechanism of the tube of the present invention
Figure 6:
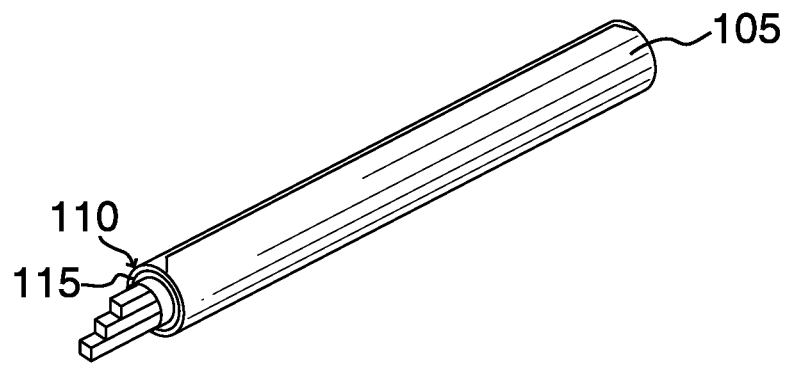
FIG. 6 shows a perspective view of the component pieces inside the tube of the present invention.

Similar to the way the frame is assembled the frame can be disassembled. The sliders can be moved away from protecting and covering the joints and connectors of the center bar or cross member bars 125, the connector pieces 130 can then be loosened to the point of releasing the interlocking joints 125 from the canvas 105 and thus separating the outer frame members 120 from each other. The canvas 105 can be removed and rolled up into the tube 110. All the component individual pieces can be inserted into a hollow tube 110 used for shipping and transporting the canvas (as shown in FIG. 6). As shown in FIG. 5, the tube 110 itself is comprised of a securing mechanism. The securing mechanism may be a male hook and loop fasteners (such as Velcro) positioned on opposing ends of the inner tube 115 and corresponding female hook and loop fastener (such as Velcro) which is attached to the backside of the canvas 105. In an alternative embodiment the female hook and loop fasteners may be positioned on opposing ends of a rolling mat which may be attached to the inner tube. In this alternative embodiment, the canvas 105 is then placed into the seams or under the seams of the rolling mat and subsequently rolled up such that the female and male hook and loop fasteners latch on to one another and neatly fit into the hollow tube. The rolled up canvas 105 allows for the individual component pieces to be fit inside the hollow tube 110 as well as shown in FIG. 6. In another embodiment, the securing mechanism may also include buttons, snaps or magnets. The hollow tube 110 can be used for shipping the canvas and all component pieces via US mail or overnight delivery services such as Fedex and UPS. In another embodiment, the canvas 105 and component pieces can be rolled up and placed inside a box or similar shaped package.

Figure 7:
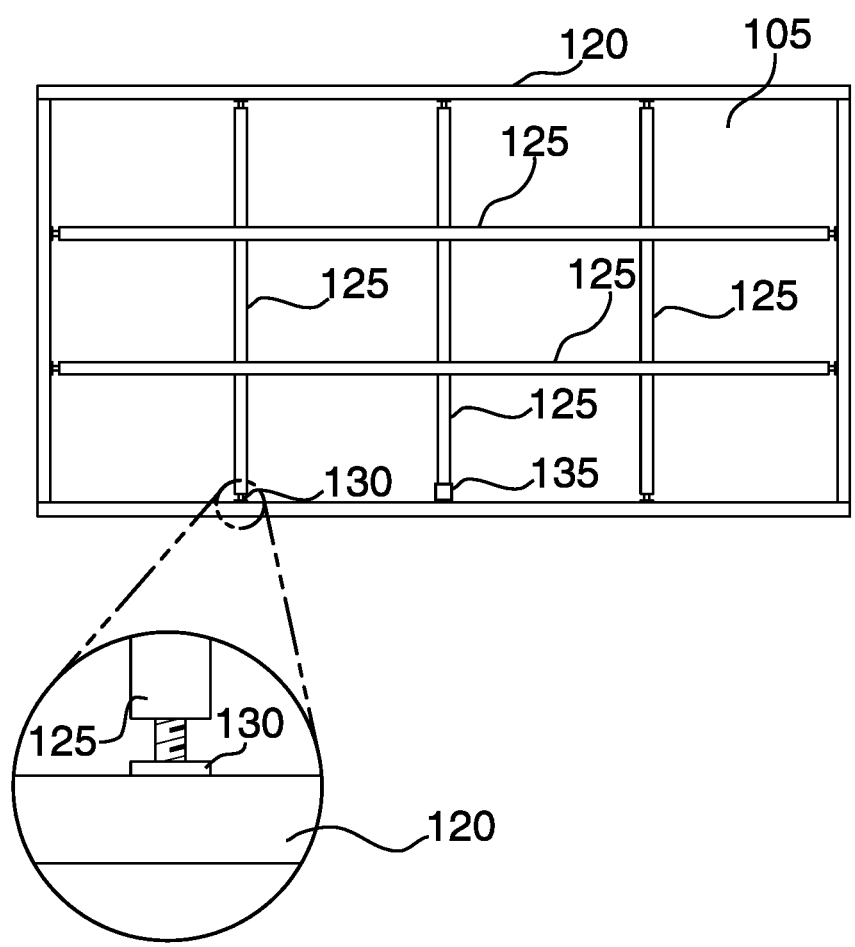
FIG. 7 shows a perspective view of the plurality of connector pieces and at least one cross member bar of the present invention.
Figure 12:
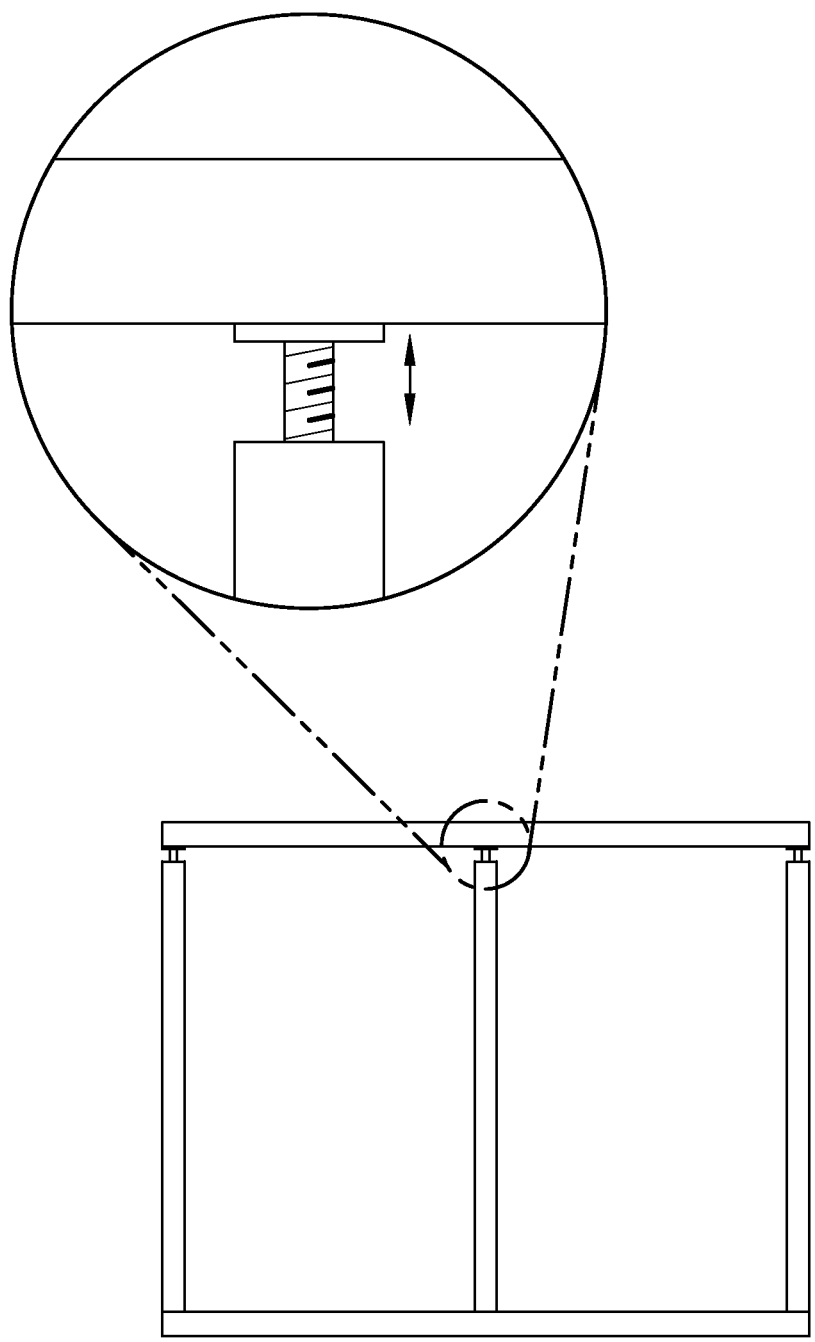
FIG. 12 shows an alternative embodiment of the screwing mechanism connecting a cross member bar to the outer frame member of the present invention.

Canvases 105 and other artistic works come in all shapes and sizes. To provide additional support to a canvas 105 the present invention may also include at least one cross member bar 125. Each cross member bar 125 may connect to the outer frame members 120 such to provide additional support for the canvas 105. In addition, the cross member bar 120 may be adapted and configured to include a securing mechanism to provide further stretching of the canvas 105. For example, as shown in FIG. 7, once the canvas 105 is secured to the outer frame member 120, the cross member bars 125 can be assembled such that a screwing mechanism 130 can act to further tighten the canvas 105 to a desired tautness. Depending on the size of the canvas 105 the need for additional cross member bars 125 with screwing mechanism may be needed. FIG. 7 shows an assembled frame of potentially a larger canvas 105 which requires more than one cross member bar 125 equipped with the screwing mechanism 130. FIG. 12 shows an assembled frame with only one cross member with a screwing or expansion mechanism.

The preferred embodiment of the present invention seeks to provide an alternative method to stretching canvas in the traditional and conventional methods. The screwing mechanism allows for the stretching or expansion of the canvas. As the screw is twisted the attached canvas is stretched and becomes taut to the desired tightness. Such expansion mechanisms may be present on all horizontal and vertical positions of the outer frame members. In an alternative embodiment, the expansion or screwing mechanism may be present on the horizontal or vertical positions of the at least cross member bars to provide a stretching of the canvas in all directions.

Figure 10:
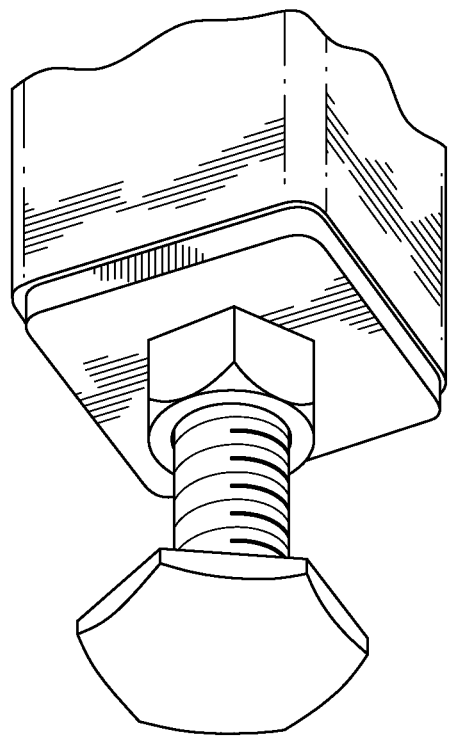
FIG. 10 shows a perspective view of the screwing mechanism of the present invention.

In another embodiment of the present invention, the slider mechanism 135 can be used to cover the screwing mechanism 130 of the cross member bars 125 for added protection. In another embodiment, the slider 135 is only present on the horizontal outer frame member of the assembled frame. In another embodiment, the slider 135 may be present on all outer frame members or only on the vertical outer frame members of the assembled frame. The screwing or expansion is best shown in FIG. 10.

Figure 8:
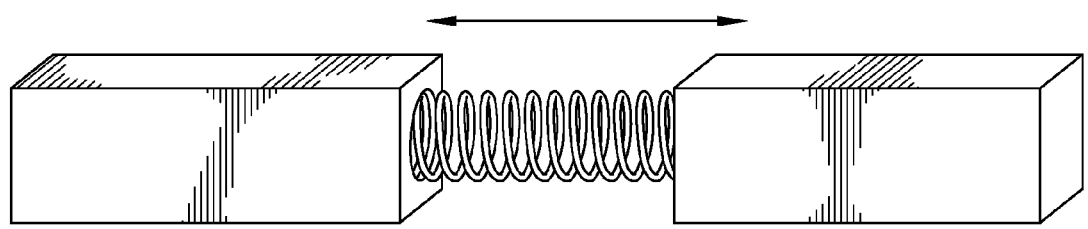
FIG. 8 shows a perspective view of a cross member bar with a spring of the present invention.
Figure 9:
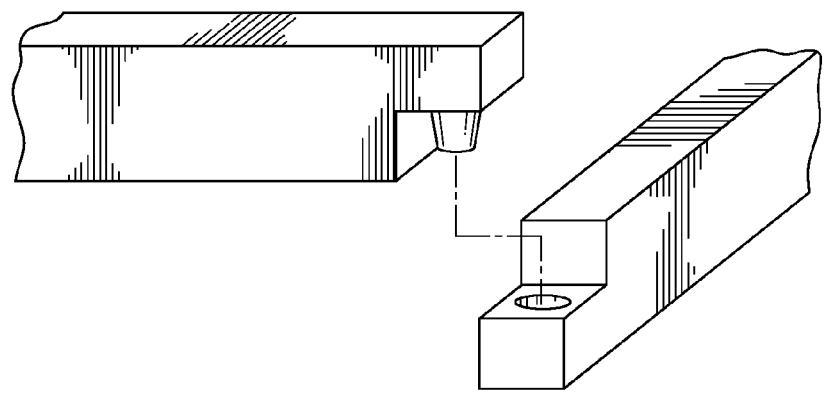
FIG. 9 shows a perspective view of an outer frame member with at least one dowel of the present invention.

In another embodiment of the present invention, as shown in FIG. 8, the cross member bar may be adapted and configured with an internal spring. The spring may act to lengthen and shorten the cross member bar as between the outer frame members. In situation where the canvas is larger or smaller the kit of the present invention may contain cross member bars that require varying lengths and ultimately varying degrees of security for the artist work. Similarly, in an alternative embodiment of the present invention, the outer frame members may be adapted and configured to include a hollow opening for the insertion of at least one dowel which can be fitted into the opening. The frame of the present invention is comprised of individual components which can be mixed and matched with varying securing mechanism. Some outer frame members may be shorter in length and longer in length and some may be connected by dowels while others are connected with other connectors. The kit was designed to accommodate varying sizes of canvases.

Figure 11A:
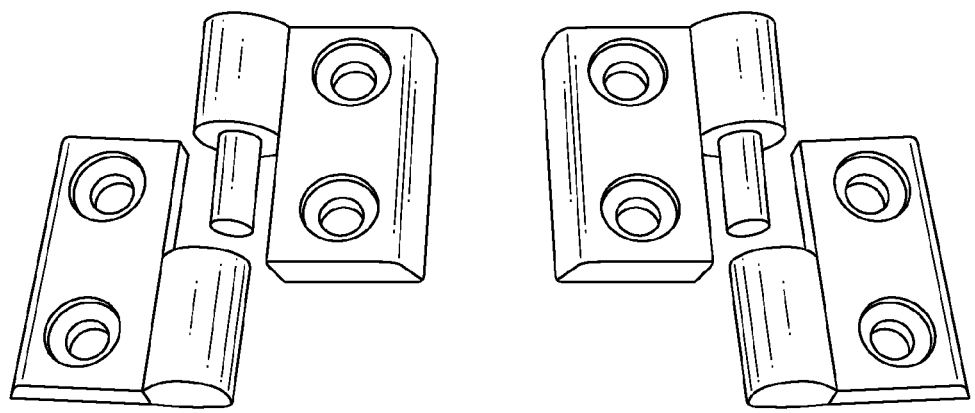
FIG. 11A shows a perspective view of the lift off hinge of the present invention.
Figure 11B:
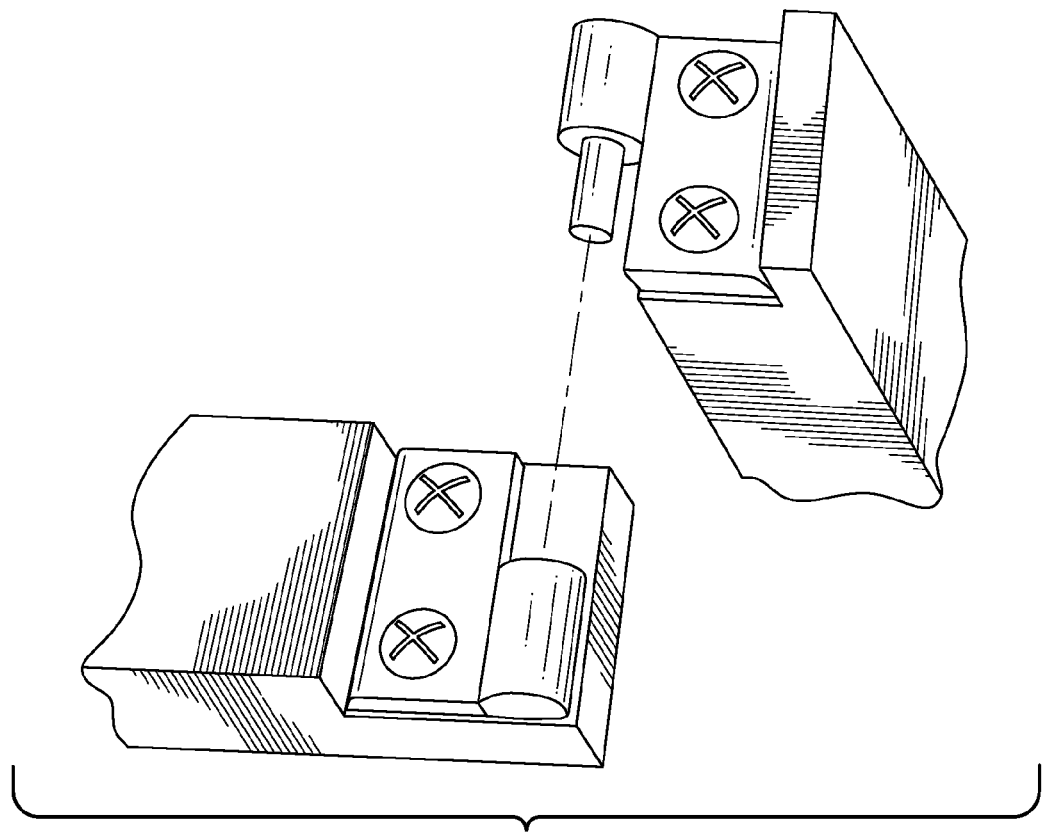
FIG. 11B shows a perspective view of the lift off hinge connecting the outer frame members together in the present invention.
Figure 13:
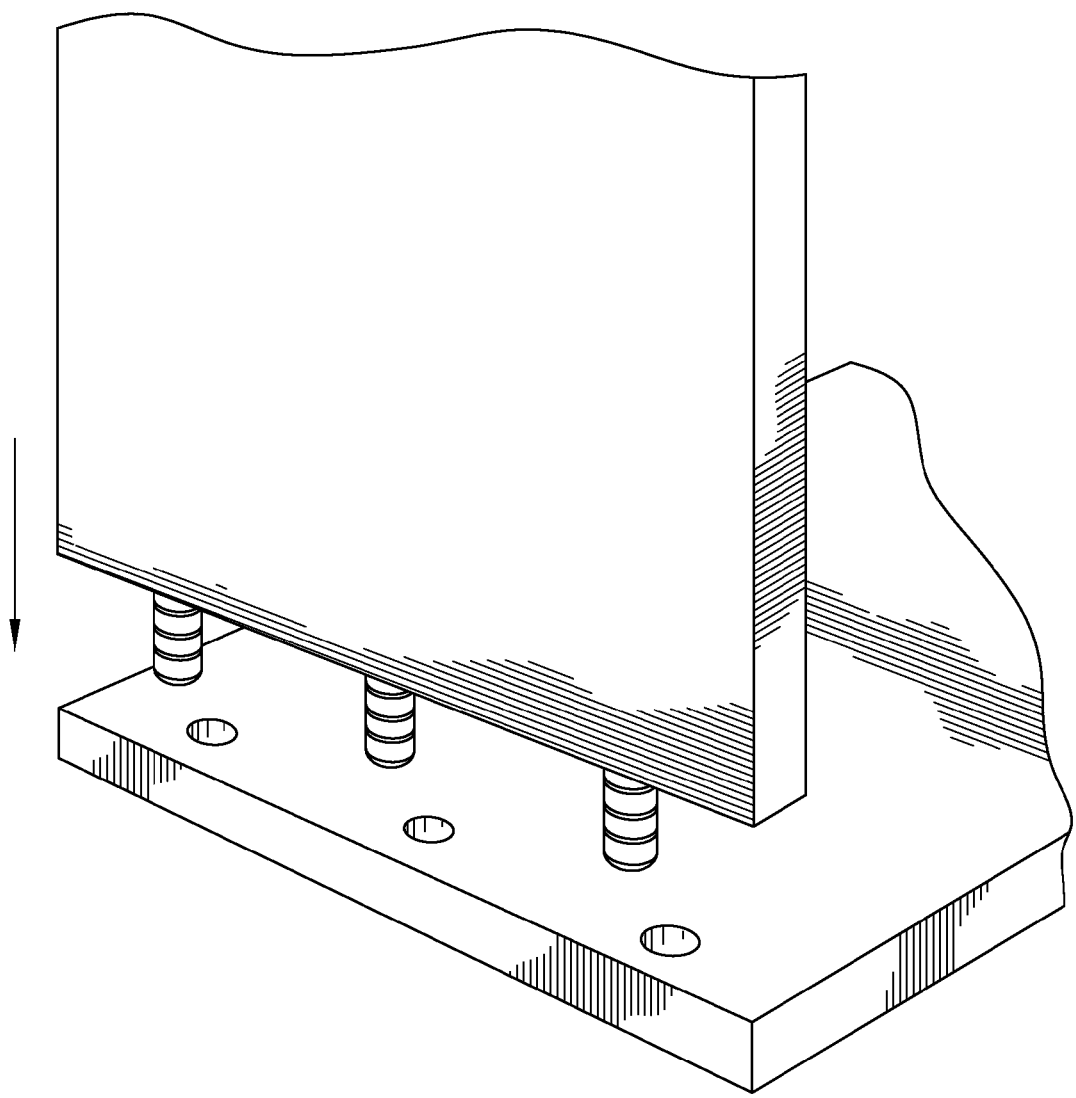
FIG. 13 shows a perspective view of the outer frame members connecting via at least one dowel of the present invention.
Figure 14A:
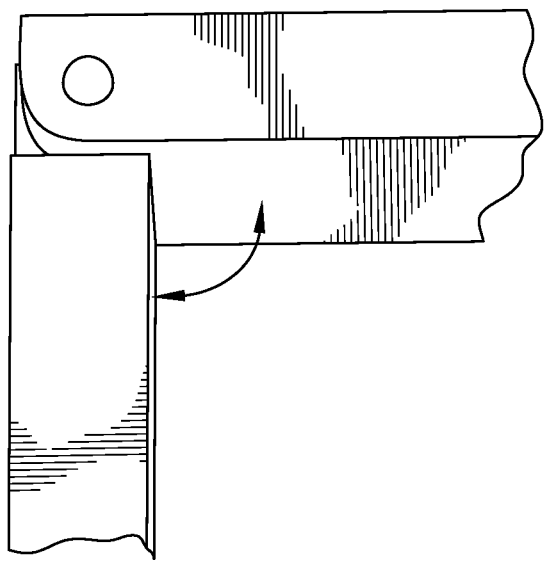
FIG. 14A shows a perspective view of movable hinged joint of the outer frame member of the present invention
Figure 14B:
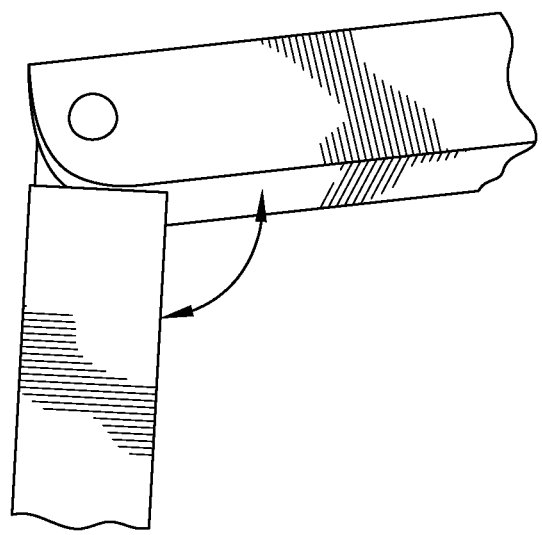
FIG. 14B shows a perspective view showing the movable hinged joint receiving a fabric material.
Figure 15:
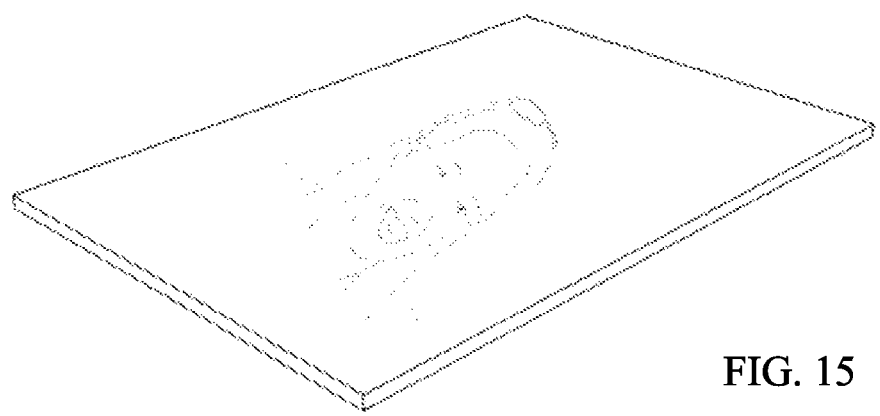
FIG. 15 is a front perspective view of an assembled frame of the present invention.
Figure 16:
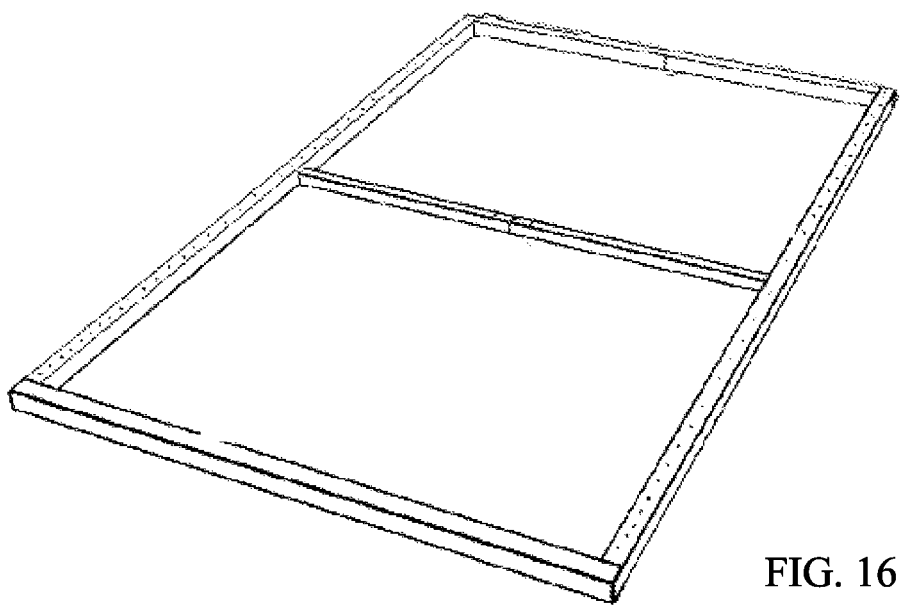
FIG. 16 is a rear perspective view of an assembled frame of the present invention.

In an alternative embodiment of the present invention, as shown in FIG. 11A, the outer frame members may be connected via at least one lift off hinge. FIG. 11B is a perspective view of the lift off hinge as it is connecting the outer frame members together in the present invention. In another alternative embodiment of the present invention the outer frame members may be connected via at least one dowel of the present invention. In another embodiment, a mortis and tenon can be used as connector piece in connecting the outer frame members to one another as well as connect cross member bars to outer frame members. FIG. 13 shows 3 dowels being used but such alternative frame models can be made with one to many dowels. In yet another alternative embodiment of the present invention, as shown in FIG. 14A, a movable hinged joint may be used to connect the outer frame member. In this embodiment of the present invention, the fabric or canvas can be inserted into the seams of the outer frame members. As shown in FIG. 14B, the canvas can secured by either cross members bars with or without hinges. The canvas can also be secured by a single screw which can connect the movable hinged joint. The single screw can further provide for the canvas to be stretched to a desired tautness. Lastly the movable hinged joint may be adapted and configured to use multiple screws for connecting the joint and for stretching the fabric (not shown). After assembly, as shown in FIG. 15, the frame contains a stretched canvas. FIG. 16 shows the rear view of an assembled frame where a center cross member bar is positioned between the connected outer frame members.

In another embodiment of the invention, the components of the frame can be individual modular and unconnected pieces. In this embodiment, the frame's outer frame members may be adapted and configured to be assembled in various shapes and sizes. For example, the length of the outer framer members that comprise the frame can be of varying lengths and widths. In yet another embodiment of the invention, the length of the frame can be made of shorter segments which may stack.

In another embodiment of the invention, the frame can be constructed of various materials such as hardwoods, plastics, rubbers, and metals. In another embodiment of the invention, for very large canvases, a screw out elbow piece would be adapted and configured to pull the fabric tight along the short and long sides. This method would require non existing hardware and mechanisms. In yet another embodiment, various corner joints designs and styles can work to assemble a frame and secure a fabric material. In yet another embodiment, the frame may include expansion arms positioned and pushing on the corners instead of across the canvas.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:
1. A frame for stretching a fabric material, comprising:
a plurality of outer frame members that, when connected, form an assembled frame;
a plurality of interlocking joints that are selectively removable from the assembled frame; and
a plurality of adjustable connector pieces;
said plurality of outer frame members adapted and configured to receive the fabric material and to enable the fabric to be positioned over said plurality of interlocking joints;
said plurality of connector pieces adapted and configured to fit into the plurality of interlocking joints thereby connecting the plurality of interlocking joints to the plurality of outer frame members; and
said plurality of connector pieces adapted and configured between the outer frame members such that the fabric material is stretched such that plurality of connector pieces enables the fabric material to be taut across the frame.

2. A frame as in claim 1, wherein the plurality of interlocking joints connect to form an angle of the outer frame members.

3. A frame as in claim 1, wherein the plurality interlocking joints connect to form a corner of the outer frame members.

4. A frame as in claim 1, wherein the plurality interlocking joints further comprises at least one lift off hinge.

5. A frame as in claim 4, wherein the at least one lift off hinge is adapted and configured to engage at least one dowel.

6. A frame as in claim 4, wherein the at least one lift off hinge is adapted and configured to engage a screwing mechanism.

7. A frame as in claim 1, wherein the plurality of outer frame members further comprises at least one dowel member and at least one hollow opening; said at least one hollow opening adapted and configured to receive the at least one dowel member.

8. A frame as in claim 1, wherein the plurality of outer frame members are collapsible.

9. A frame as in claim 1, wherein the fabric material is at least one of canvas, light sensitive paper, cellulose nitrate, cellulose acetates, and polyester.

10. A frame as in claim 1, wherein the plurality of connector pieces further comprises a screwing mechanism.

11. A frame as in claim 1, further comprising at least one sliding piece.

12. A frame as in claim 1, wherein the at least one sliding piece is adapted and configured to cover the plurality of connector pieces.

13. A frame as in claim 1, wherein the plurality of outer frame members and plurality of interlocking cornered joints are adapted and configured to be positioned along a horizontal end of the plurality of outer frame members.

14. A frame as in claim 1, wherein the plurality of outer frame members and plurality of interlocking cornered joints are adapted and configured to be positioned along a vertical end of the plurality of outer frame members.

15. A frame as in claim 1, further comprising at least one cross member bar.

16. A frame as in claim 15, wherein the at least one cross members bar is positioned horizontally, vertically or diagonally between the plurality of outer frame members.

17. A frame as in claim 15, wherein the at least one cross member bar further comprises a spring; said spring adapted and configured to provide tension between the plurality of outer frame members.

18. A frame as in claim 1, wherein the plurality of outer frame members further comprises a movable hinged joint.

19. A kit for creating a collapsible frame for fabric material, wherein a plurality of component pieces comprises:
- a hollow tube; said hollow tube able to receive the plurality of component pieces
- a plurality of outer frame members that, when connected, form an assembled frame;
- a plurality of interlocking joints that are selectively removable from the assembled frame; and
- a plurality of adjustable connector pieces;
- said plurality of outer frame members adapted and configured to receive a fabric and to enable the fabric to be positioned over said plurality of interlocking joints;
- said plurality of connector pieces adapted and configured between the outer frame members to fit into the plurality of interlocking joints thereby connecting the plurality of interlocking joints to the plurality of outer frame members; and
- said plurality of connector pieces adapted and configured to be movable such that the fabric material is stretched to a desired tightness over the frame.

20. The kit as in claim 19, wherein a securing means is attached to an inner lining of the hollow tube.

21. The kit as in claim 20, wherein the securing means includes a fastening mechanism selected from the group consisting of a hook and loop fastener, a button, a snap, a hook, and a magnet.

22. A method for stretching a fabric material over a frame, the steps of which include:
- connecting a plurality of outer frame members via a plurality of interlocking joints into an assembled frame having a shape corresponding to a fabric material, wherein the plurality of interlocking joints are selectively removable from the assembled frame;
- placing the fabric material over the connected plurality of outer frame members;
- inserting a plurality of adjustable connector pieces into the plurality of interlocking joints;
- twisting said plurality of connector pieces such to stretch the fabric material to a desired tautness, wherein the plurality of connector pieces are positioned between the connected plurality of outer frame members.

* * * * *